US008559332B2

(12) United States Patent
Yanggratoke et al.

(10) Patent No.: US 8,559,332 B2
(45) Date of Patent: Oct. 15, 2013

(54) METHOD FOR ENHANCING TABLE LOOKUPS WITH EXACT AND WILDCARDS MATCHING FOR PARALLEL ENVIRONMENTS

(75) Inventors: Rerngvit Yanggratoke, Stockholm (SE); Hareesh Puthalath, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 197 days.

(21) Appl. No.: 13/111,497

(22) Filed: May 19, 2011

(65) Prior Publication Data

US 2011/0292830 A1  Dec. 1, 2011

Related U.S. Application Data

(60) Provisional application No. 61/348,038, filed on May 25, 2010.

(51) Int. Cl.
*G01R 31/08* (2006.01)
(52) U.S. Cl.
USPC .......................................................... 370/253
(58) Field of Classification Search
None
See application file for complete search history.

(56) References Cited

U.S. PATENT DOCUMENTS

| 5,526,496 A * | 6/1996 | Alnuweiri ..................... 710/125 |
| 2003/0081615 A1* | 5/2003 | Kohn et al. ............. 370/395.42 |
| 2008/0071779 A1 | 3/2008 | Mammen et al. |

FOREIGN PATENT DOCUMENTS

WO  2009/042919 A2  4/2009

OTHER PUBLICATIONS

OpenFlow switch specification v 1.0.0 Dec. 2009 OpenFlow organization (www.openflow.org).*
Towards high performance flow level packet processing on multi core network processors Qi et al. Dec. 2007 Published by ACM.*
AA-Sort: A new parallel sorting algorithm for multi-core SIMD processors Inoue et al. 2007 Published in IEEE PACT.*
McRT-STM—a high performance software transactional memory system for a multi core runtime: Saha et al. 2006 Published by ACM.*
Bianco A. et al.: "OpenFlow Switching: Data Plane Performance"; Communications (ICC), 2010 IEEE, International Conference on, IEEE, Piscataway, NJ, USA; May 23, 2010; pp. 1 to 5; XP031702920.
International Search Report for PCT/IB2011/052226 dated Aug. 22, 2011; 5 pages.

* cited by examiner

*Primary Examiner* — Otis L Thompson, Jr.
*Assistant Examiner* — Rina Pancholi
(74) *Attorney, Agent, or Firm* — Christopher & Weisberg, P.A.

(57) ABSTRACT

Presented are methods for performing a constant time flow lookup utilizing parallel processing technology. The methods are suitable for multiprocessor and/or multi-core processor computing environments. The method generates hash table driven tables of exact flow matching patterns and then provides the generated tables to parallel processing based flow selection procedure that iteratively finds the highest priority flow from the exact flow matching patterns. The method is scalable based on the linear relationship between the number of processors and/or processor cores and the time required to perform the lookup. The method is also portable because it does not require any special or custom hardware typically associated with this type of lookup.

23 Claims, 9 Drawing Sheets

METHOD FOR ENHANCING TABLE LOOKUPS WITH EXACT AND WILDCARDS MATCHING FOR PARALLEL ENVIRONMENTS

RELATED APPLICATION

The present application is related to, and claims priority from, U.S. Provisional Patent Application No. 61/348,038, filed May 25, 2010, entitled "Method for Enhancing Table Lookups with Exact and Wildcards Matching for Parallel Environments", to Rerngvit Yanggratoke and Hareesh Puthalath, the disclosure of which is incorporated herein by reference.

TECHNICAL FIELD

The present invention relates generally to table lookups and more specifically to performing deterministic lookups tuned for parallel or multi-core processor systems utilizing single instruction multiple data (SIMD) instructions.

BACKGROUND

A lookup operation on the table with one or more columns with fields consisting of exact and wildcard values is important for many network technologies. The technologies include, but are not limited to, flow lookup in an OpenFlow switch, forwarding table lookups, policy tables, etc. The flow lookup in an OpenFlow switch will be described in this document as an exemplary embodiment. It should be noted that the described method is applicable to other technologies using both exact and/or wildcard table lookup techniques.

Figure 1:
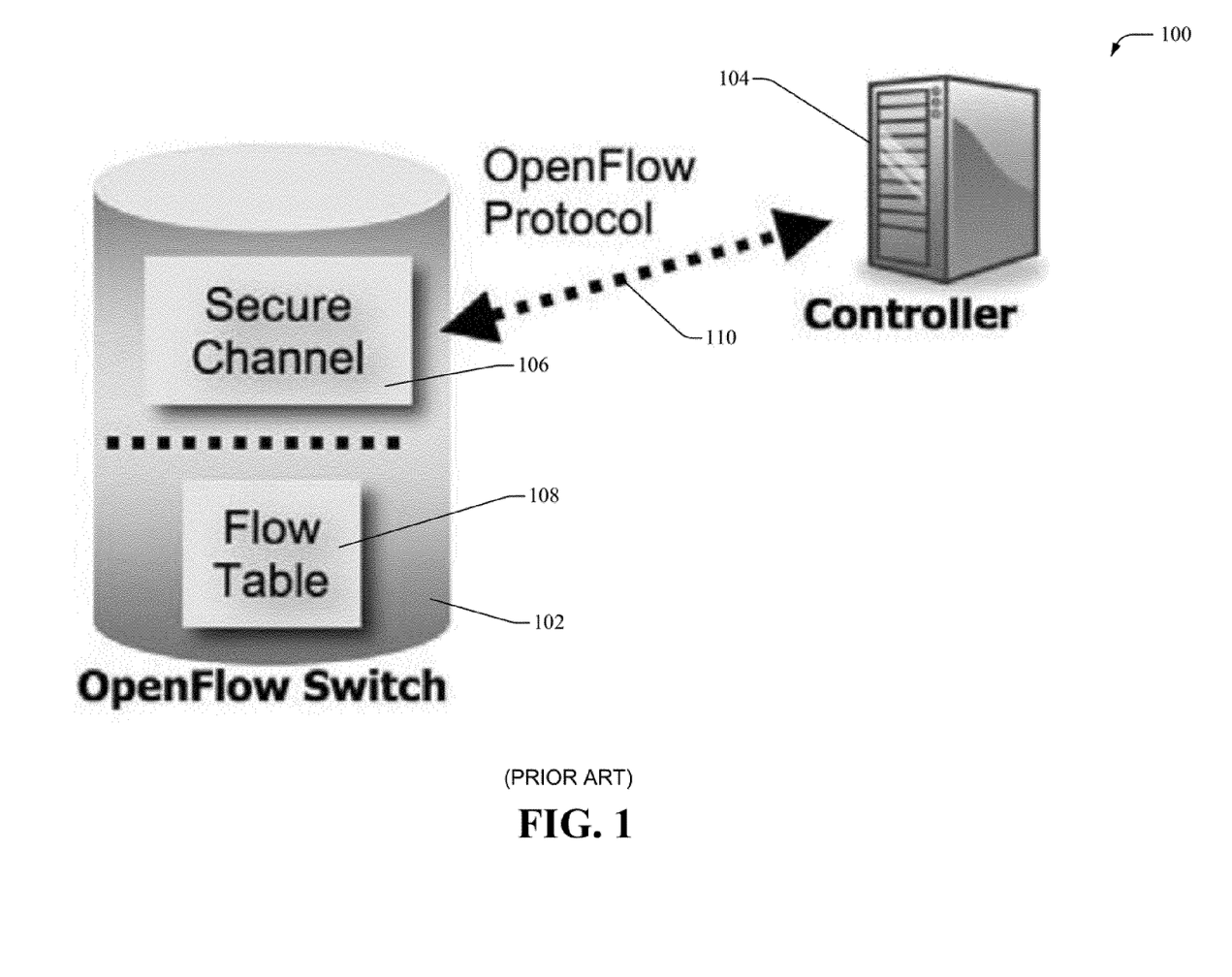
FIG. 1 depicts a prior art system of an OpenFlow system providing a lookup capability using the OpenFlow protocol between an OpenFlow switch and a controller.

OpenFlow is an open standard for decoupling the control path and data path in a switch. OpenFlow aims to provide a highly configurable and flexible switch. OpenFlow works with two separate components including a controller and an OpenFlow switch as shown in FIG. 1. The controller can be located in the same device or on another device on the network. The controller controls the OpenFlow switch via a secure channel using the OpenFlow protocol. The basic concept in an OpenFlow switch lies in the notion of a flow. The flows are stored in a table called a flow table. Each flow is associated with a flow action, executed by the switch if the packet is matched against the flow. Example actions include, but are not limited to dropping a packet or forwarding a packet to a predefined port associated with the action.

The flow table consists of the flow entries with each entry made up of the 12 fields shown in Table 1 and not every field is applicable for every packet. The applicability of each field depends on the packet type as noted in the last column of the table. Each field inside the flow can be specified with exact or any value. If the flow contains at least one any value, the row is a wildcard matching flow, otherwise, the flow is an exact matching flow.

TABLE 1

Flow fields in OpenFlow flow table

| No. | Field | When applicable |
|---|---|---|
| 1 | Ingress port | Every packet |
| 2 | Ethernet source address | Every packet on enabled-ports |
| 3 | Ethernet destination address | Every packet on enabled-ports |
| 4 | Ethernet type | Every packet on enabled-ports |
| 5 | VLAN id | Every packet with Ethernet type equal to 0x8100 |
| 6 | VLAN priority | Every packet with Ethernet type equal to 0x8100 |
| 7 | IP source address | Every packet with Ethernet type equal to 0x0800 (IP) and 0x0806 (ARP) |
| 8 | IP destination address | Every packet with Ethernet type equal to 0x0800 (IP) and 0x0806 (ARP) |
| 9 | IP protocol | Every IP, IP over Ethernet, and ARP packet |
| 10 | IP ToS bits | Every packet with Ethernet type equal to 0x0800 (IP) |
| 11 | Transport source port/ICMP type | Every TCP, UDP, and ICMP packet |
| 12 | Transport destination port/ICMP code | Every TCP, UDP, and ICMP packet |

A packet arriving at the OpenFlow switch will be looked up in the flow table. If the packet matches a flow, either exact or wildcard matching flow, the specified action associated with the flow will be executed on the packet. Each wildcard matching flow has a priority assigned and if a packet matches multiple wildcard flows, the highest priority wildcard flow will be selected. An exact matching flow is always given higher priority than a wildcard matching flow. If the packet could not be matched with any flows then it will be sent to the controller for further instruction. The flow lookup is a computation-intensive task for an OpenFlow switch because the lookup must be performed on every packet.

Single Instruction Multiple Data (SIMD) is a type of parallel computing where multiple processing units process several data items concurrently. A SIMD style of processing is utilized in vector processing when the same instruction is executed on independent data items. This style of processing architecture is highly efficient for data parallel style of computing. An example of a vector processor using SIMD style of parallel computing is a graphical processing unit (GPU). The processor operates on multiple data concurrently with the condition that the instruction has to be the same for every processing unit. As a result, to fully exploit this architecture, the problem or algorithm has to be designed for data parallel processing. Because the flow lookup operation for a packet is computation intensive, as explained in the previous section, a SIMD processor is a cost effective solution for improving the lookup performance. By improving the lookup algorithm to utilize a data parallel style, several entries could be concurrently processed with a SIMD processor.

The existing solutions consist of both software and hardware based implementations. The software implementation is used in the Openflow switch reference implementation. An example of the hardware implementation is the NetFPGA OpenFlow switch reference implementation.

Figure 2:
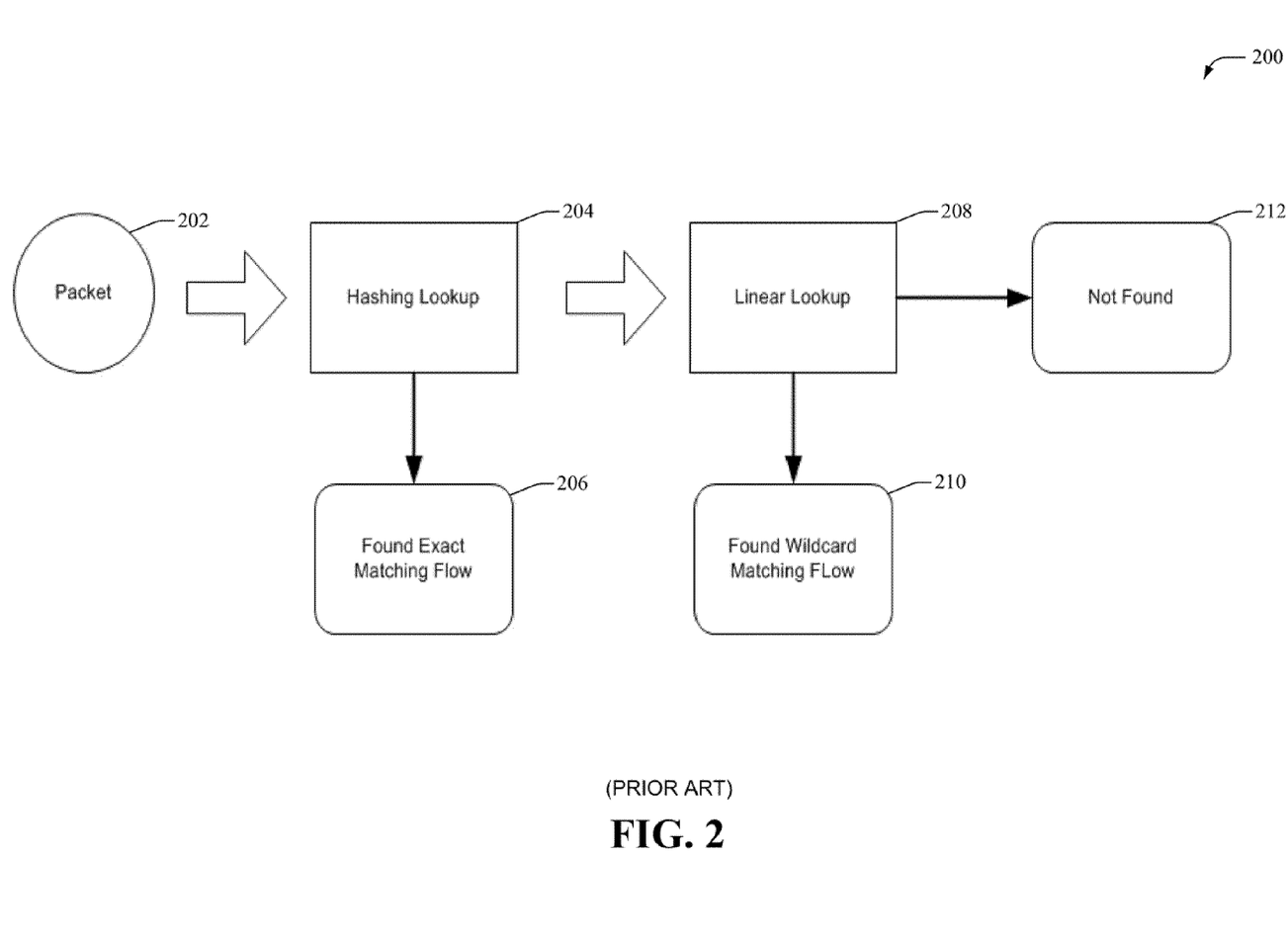
FIG. 2 depicts a prior art method of providing a lookup based on a hashing lookup and a linear lookup.
Figure 3:
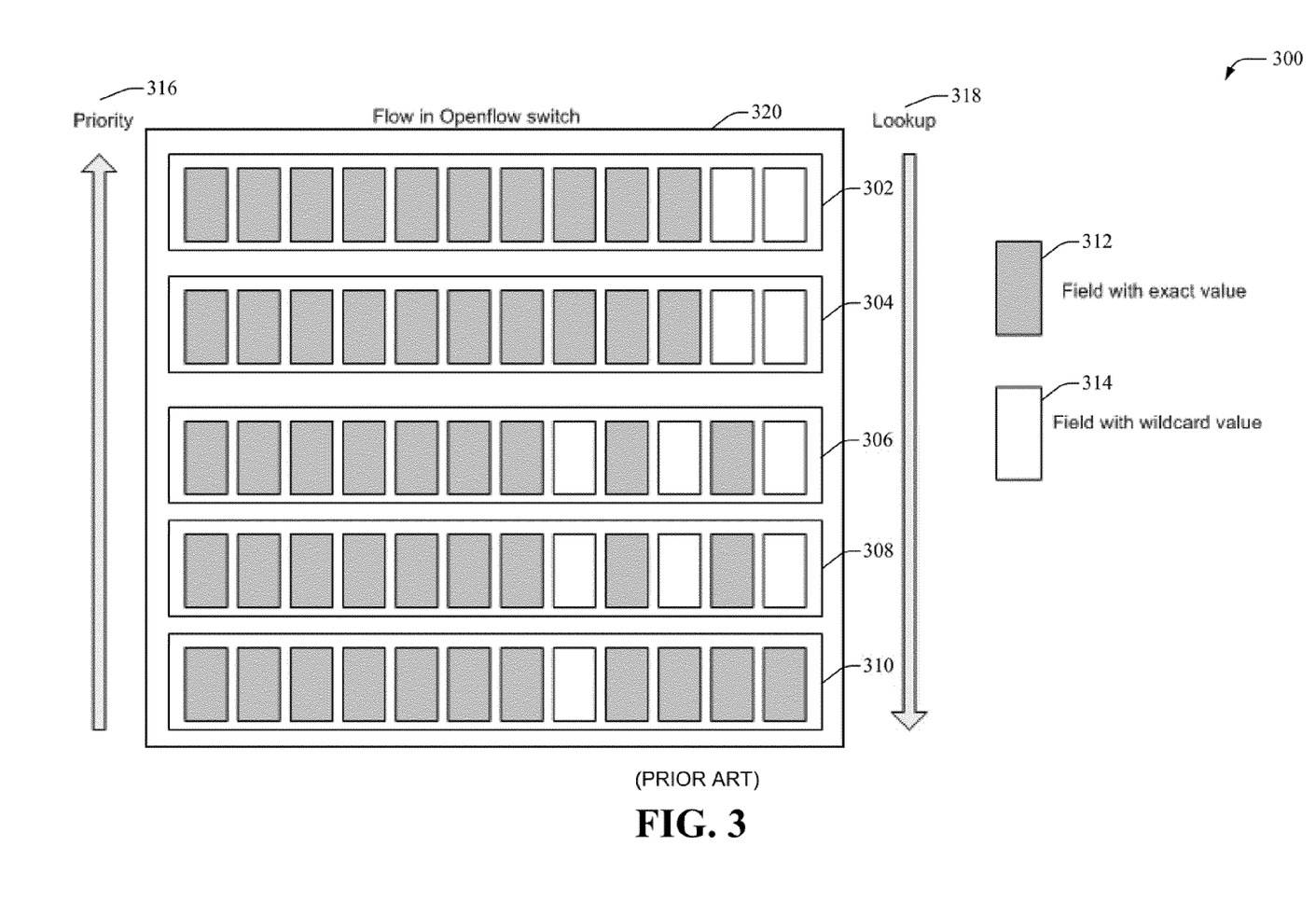
FIG. 3 depicts a prior art software-based lookup method for a wildcard matching flow of an OpenFlow switch.

The software implementation lookups the flows in the flow table with the hash-then-linear lookup shown in FIG. 2. The lookup consists of two consecutive phases including hashing lookup and linear lookup phase. In the hashing lookup phase, the headers of a packet arriving to the switch will be extracted and then the hashing lookup will be performed on all of the 12 fields. If the hashing lookup found the exact matching flow, the search ends immediately. Otherwise, the search will continue to the linear lookup for wildcard matching flow. In the linear lookup phase, the search will start on the highest priority flow and go on until the end of the wildcard matching flow table as shown in FIG. 3.

Figure 4:
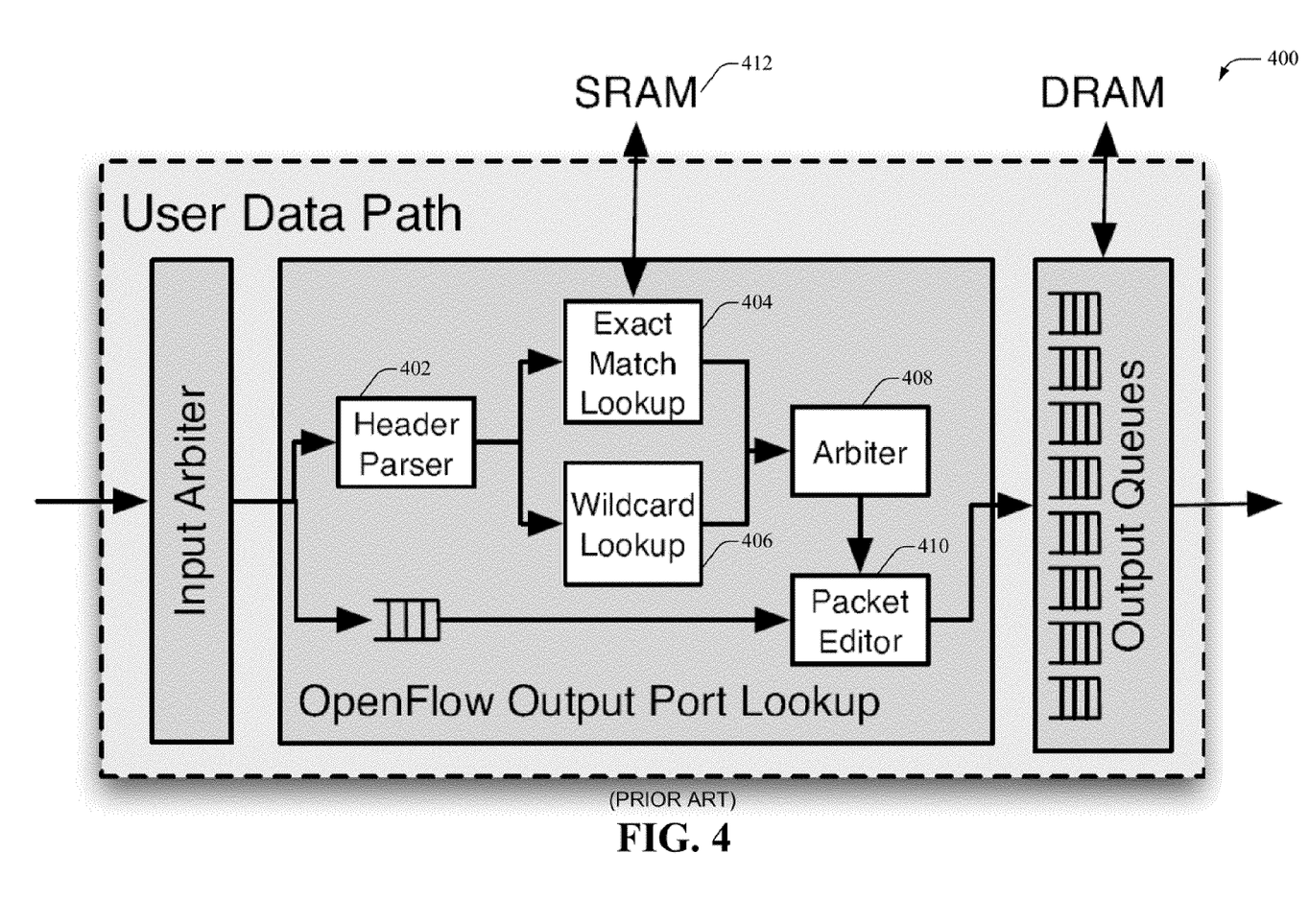
FIG. 4 depicts a prior art hardware-based lookup method of an OpenFlow switch.

The hardware implementation looks up the flow with several stages as shown in FIG. 4. The header parser component will extract fields from the packet and pack them together. Then, the packed fields will be sent to the Wildcard Lookup and the Exact Match Lookup modules. Both the Wildcard Lookup and Exact Match Lookup modules will operate simultaneously. The Exact Match Lookup module uses a hashing lookup into an off-chip static random access memory (SRAM) while the Wildcard Lookup performs its operation with on-chip ternary content addressable memory (TCAM). The result of both lookups will go into the arbiter to select the highest priority result. The arbiter will control the Packet Editor, modifying the packet according to the matched flow.

Existing solutions suffer from various drawbacks. The software based hash-then-linear lookup has a problem with the linear lookup operation for the wildcard matching flow. The processing complexity ($P_c$) of the linear lookup is function of the number of wildcard matching flows (n), i.e. $P_c(n)$. In other words, the required computation steps will grow based on the number of wildcard matching flows in the flow table and therefore is not a scalable solution because of the reduction in lookup speed.

The hardware solution offers the line rate packet lookup and forwarding for both exact and wildcard matching flows. However, the hardware solution demands special and expensive hardware including SRAM for exact matching lookup and TCAM for wildcard matching lookup. Accordingly, the hardware solution will have a limited size of the flow table. The limitations for current implementations are 32000 and 32 entries for the exact matching flows and wildcard matching flows respectively. Additionally, there are limitations in space and power utilization and the need for custom chips.

Accordingly, market pressure is building for a method and system capable of providing a deterministic table lookup without requiring expensive and/or custom hardware. It is desirable that the method and system be scalable in a multi-processor and/or a multi-core computing environment.

SUMMARY

Methods address the market needs described above by providing the capability lookup a highest priority flow based on an arriving packet. The methods generate flow exact patterns and utilize the flow exact patterns to perform a parallel processed flow selection based on determining the highest priority flow. The methods store the flow exact patterns in a table of hash tables for efficient selection. The methods further iterate through the table of hash tables until the highest priority flow is determined.

In one exemplary method embodiment, a plurality of flow exact patterns is generated, based on an associated flow table, for grouping flows based on similar exact value fields. In another aspect of the exemplary method embodiment, a parallel flow selection, based on the previously generated flow exact patterns, is performed for selecting the highest priority flow from the flow exact patterns.

In another exemplary method embodiment, flows are grouped together for efficient processing. In another aspect of the exemplary method embodiment, a plurality of flows are compared and the indexes of all flows wherein all fields of the flows have the same exact value are grouped together. In another aspect of the exemplary method embodiment, a table is generated for each generated group of matching flows. In a further aspect of the exemplary embodiment, a predetermined flow priority is stored in the table with each flow index.

In yet another exemplary method embodiment, the highest priority flow from a group of flows is selected. In one aspect of the exemplary embodiment, the plurality of flows is distributed equally among a plurality of processors and/or processor cores. In another aspect of the exemplary embodiment, a first iteration by each processor and/or processor core through the assigned flows compares priorities to determine the flow with the highest priority. In another aspect of the exemplary embodiment, a second iteration of comparing the output from each processor and/or processor core is performed to determine the flow with the highest priority.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

The flow lookup in an OpenFlow switch will be described in this document as an exemplary embodiment. It should be noted that the described method is applicable to other technologies using both exact and/or wildcard table lookup techniques.

Looking first to FIG. 1, a diagram 100 of a prior art system of providing a lookup operation is illustrated and will provide a context for describing the exemplary embodiments provided herein. The prior art system includes an OpenFlow switch 102 communicating with a controller 104 using the OpenFlow protocol 110. Further, the prior art method depicts a secure channel 106 and a flow table 108 as components of the OpenFlow switch 102. A detailed description of this prior art is presented in the above described background section.

Looking now to FIG. 2 and another prior art embodiment, is a software method for providing a lookup operation. The prior art method begins with a packet 202 arrival and a hashing lookup 204 based on the fields included in the packet 202. If an exact matching flow 206 is found then the lookup is complete. If an exact matching flow 206 is not found, then the lookup method proceeds with a linear lookup 208. If a wildcard matching flow 210 is found then the lookup is complete. If a wildcard matching flow 210 is not found 212 then the packet is forwarded to the controller for further processing. It should be noted, as described in the background section that the linear lookup 208 step is a non-deterministic step and can therefore take a significant amount of time based on the processing capabilities of the computing environment.

Looking now to FIG. 3, a further prior art exemplary method embodiment 300 of the software based linear lookup in an OpenFlow switch is illustrated. As described previously in the background section, the linear lookup 318 begins on the highest priority 316 flows 302, 304, 306, 308, 310 in the wildcard matching flow table 320 and proceeds until a match is found or the end of the wildcard matching flow table 320 is reached.

Turning now to FIG. 4, another prior art exemplary embodiment 400 of a hardware based linear lookup in an OpenFlow switch is illustrated. As described previously in the background section, the header parser 402 will extract fields from the incoming packet and pack them together for simultaneous delivery to the exact match lookup component 404 and the wildcard lookup component 406. In the prior art embodiment, the exact match lookup component 404 uses a hashing lookup into off-chip static random access memory (SRAM) 412 while the wildcard lookup component 406 performs the wildcard lookup on on-chip ternary content addressable memory (TCAM). The prior art exemplary embodiment continues with both results provided to the arbiter component 408 where the highest priority result is selected and provided to the packet editor 410 to modify the packet according to the matched flow, as directed by the arbiter 408.

The following exemplary method embodiments describe a mechanism to facilitate exact matching flow lookup and wildcard flow lookup in a manner that is ideal for a parallel processor utilizing single instruction multiple data (SIMD) instructions or a multi-core processor. The exemplary method embodiments provide a constant time lookup for both the exact matching and the wildcard matching without a time consuming and unbounded linear lookup or special and expensive hardware. Further, the exemplary embodiments are scalable to the number of SIMD cores providing for a definable increase in capacity and/or performance. For example, the constant time is reduced linearly with the increasing number of SIMD execution cores. Unlike the prior art illustrated previously, the exemplary embodiments provide a flow exact pattern method and a parallel flow selection method constructed to take advantage of a parallel computing environment utilizing SIMD instruction set computation.

Figure 5:
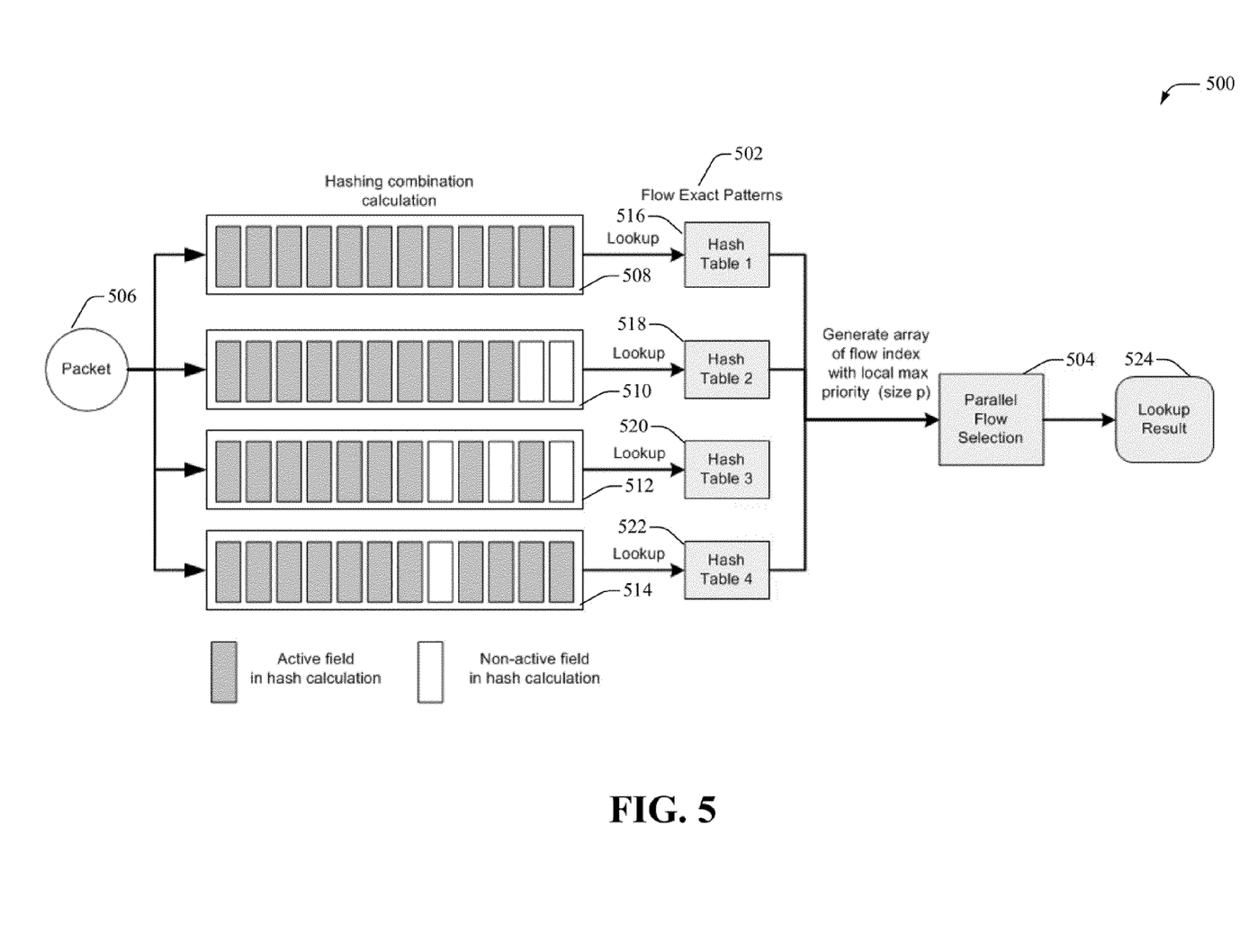
FIG. 5 depicts an SIMD exact and wildcard lookup method for a parallel processing environment.

Looking now to FIG. 5, an exemplary embodiment 500 of a mechanism to perform a deterministic lookup utilizing a flow exact pattern 502 and a parallel flow selection 504 is depicted, including a packet 506 for processing, the flows 508, 510, 512, 514 associated with the arriving packet 506, the hash tables 516, 518, 520, 522 associated with the flow exact patterns 502, the parallel flow selection 504 mechanism for selecting a lookup result 524 based on the array of flow index with local maximum priority. Next in the exact pattern lookup phase of the exemplary embodiment, the lookup is described by the following pseudo code:

```
For each Pi concurrently do
    For each e ∈ Ei do
        f = LF(e)
        if (f != −1 && Priority(f) > Priority(MaxFi))
            MaxFi = f
``` with P=Set of SIMD cores; Pi=SIMD core at index i; LF(e) =function to lookup a flow index from a flow exact pattern hash table based on a flow exact pattern (e) and return a valid flow index for a match or a non-valid flow index if a match is not found; Priority(f)=function to lookup the priority value based on the flow index; MaxF=array containing flow indexes with local maximum priority shared across the set P; MaxFi=flow index with local maximum priority for each Pi (initialized to a non-valid index value); and Ei=set of flow exact patterns distributed equally to Pi.

Continuing with the exemplary embodiment, as stated in the pseudo code, the flow exact patterns 502 are distributed equally among the SIMD cores and, the operations inside the loop including LF(e), Priority(f), and comparisons are constant time operations. Accordingly, the computation time is calculated as O(E/P) where E is the number of flow exact patterns (maximum number is 4096 for the 12 field exemplary embodiment) and P is the number of SIMD cores. The output from this phase, flow exact patterns, is the MaxF array containing flow indexes with local maximum priority and the output array's size is P. It should be noted in the exemplary embodiment that this array is an input to the second phase parallel flow selection.

Next in the exemplary embodiment, the parallel flow selection 504 second phase, the MaxF array is searched by the previously described parallel flow selection 504. With respect to the exemplary embodiment of FIG. 7, it can be seen that such a search uses log 2 n computation time where n is the number of input values. As a result for this exemplary embodiment, the computation time for the parallel flow selection 504 phase is O(log 2 P). Combining the flow exact pattern 502 phase and the parallel flow selection 504 phase, the total computation time is O(E/P+log 2 P) where the maximum for E is 4096 in the twelve field example of the exemplary embodiment.

The exemplary embodiments provide a constant time lookup and scalability to the number of multi-processor cores using SIMD instruction sets, without the use of any special hardware. It should be noted in the exemplary embodiments that the number of computation steps is bounded by the maximum number of flow exact patterns. It should also be noted in the exemplary embodiments that the bounded steps provide the constant time lookup for both the exact matching flows and the wildcard matching flows. Further, it should be noted, as illustrated previously, that the exemplary embodiments constant time operations are scalable to additional processors and/or multi-core processors with a greater number of cores providing for a scalable solution that reduces the lookup time linearly by adding additional processors or cores. The exemplary embodiments are also portable because no dedicated hardware is required to perform the lookup and the size of the flow tables can be significantly larger than the lookup tables associated with a dedicated hardware solution based on the expense of the dedicated hardware.

In another aspect of the exemplary embodiment, an apparatus comprising a plurality of processor cores can be configured to generate a plurality of flow exact patterns, based on an associated plurality of flows and to select a highest priority flow utilizing a parallel flow selection, based on the plurality of flow exact patterns. It should be noted that the processor cores of the apparatus should be configured to execute single instruction multiple data instructions (SIMD). Continuing with the exemplary embodiments, an apparatus comprising a plurality of processor cores can be configured to compare a plurality of flows and group indexes of all flows where all the exact fields of the plurality of flows having the same exact value are matched, to generate a table for each group of said indexes and to store a predetermined flow priority with each flow index in the table. It should be further noted that an additional entry is generated in the table with all fields being wildcards for a default matching entry. Further, in an exemplary embodiment, an apparatus comprising a plurality of processor cores can be configured to distribute a plurality of flows equally among said plurality of processor cores, to perform a first iteration of each processor core through comparing assigned flows to select a flow with a highest priority as output and to perform a second iteration of comparing said output from each processor core to select a flow with a highest priority as output.

Figure 6:
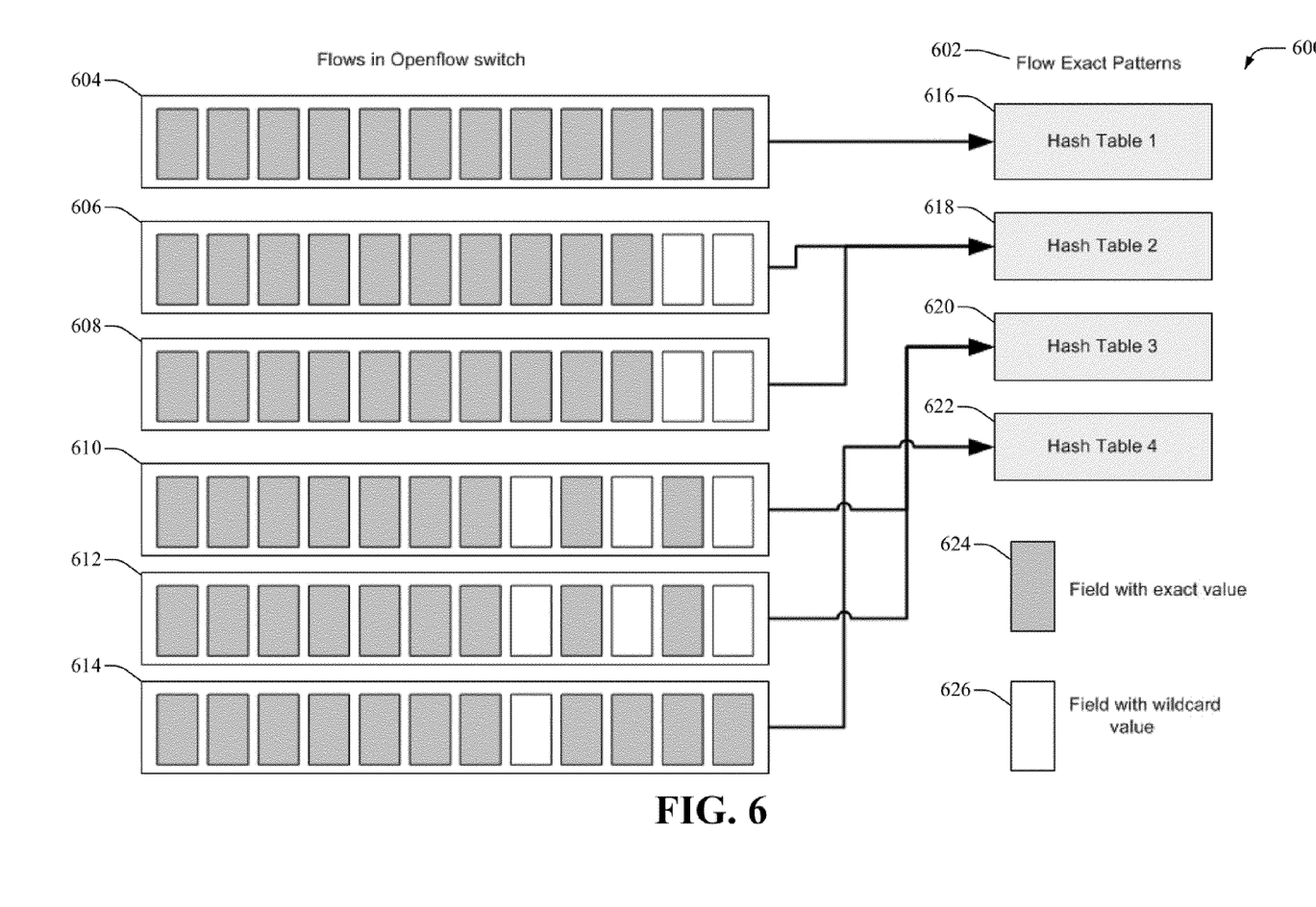
FIG. 6 depicts a flow exact pattern hash table generation method for a parallel processing environment.

Turning now to FIG. 6, an exemplary embodiment 600 of generating flow exact patterns 602 is depicted, including a series of flows 604, 606, 608, 610, 612, 614 and an associated series of flow exact pattern 602 hash tables 616, 618, 620, 622 based on the flows 604, 606, 608, 610, 612, 614. In the exemplary embodiment, the flow exact pattern 602 is a pattern for grouping flows 604, 606, 608, 610, 612, 614 with similar exact value fields 624 in the flow table. This fact of the exemplary embodiment converts a wild card search operation into an exact match operation. Hence, in the exemplary embodiment, the number of flow exact patterns 602 is equal or less than the number of flows. Further in the exemplary embodiment, each flow exact pattern has its own hash table 616, 618, 620, 622 for storing the flows within the pattern.

Continuing with the exemplary embodiment, the number of flow exact patterns depends on the flows in the flow table but the maximum is bounded based on the maximum number of fields. For example, the maximum number of flow exact patterns for a twelve field header is the number of possible twelve-field combinations plus one, with the plus one field being a special pattern wherein every field is a wildcard field for use as a default matching pattern. Accordingly, the number for this exemplary embodiment can be calculated as follows:

$$\binom{12}{12}+\binom{12}{11}+\binom{12}{10}+\ldots+\binom{12}{3}+\binom{12}{2}+\binom{12}{1}+1=4096$$

Figure 7:
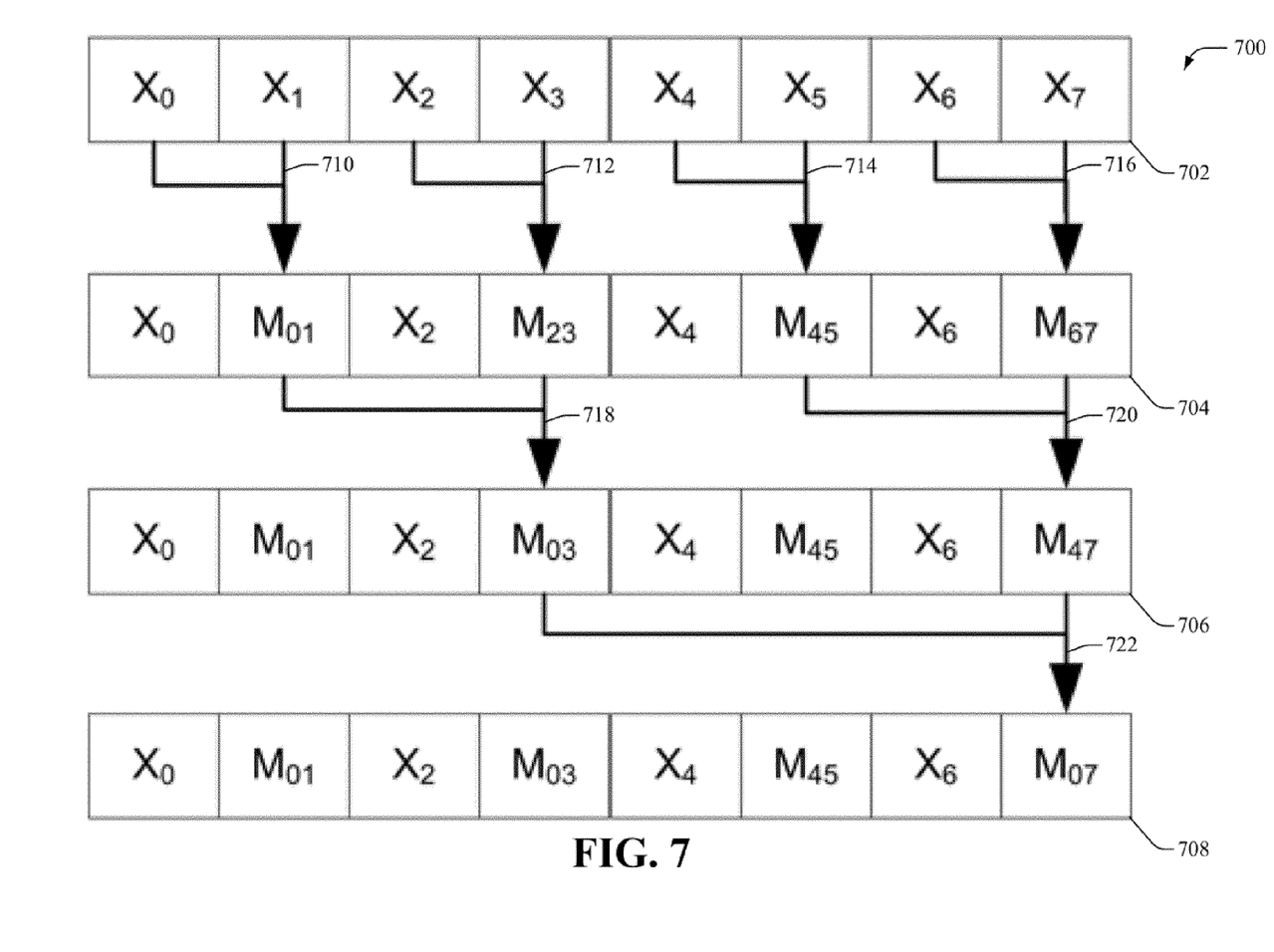
FIG. 7 depicts a parallel flow selection method for a parallel processing environment.

Turning now to FIG. 7, an exemplary embodiment of a parallel flow selection 700 is depicted, including a series of computational steps 702, 704, 706, 708 and a series of priority comparisons 710, 712, 714, 716, 718, 720, 722. Parallel flow selection in the exemplary embodiment is a search for the flow with the highest priority, accomplished by dividing the work among SIMD cores. The exemplary embodiment search iterates through several rounds 702, 704, 706, 708 until the flow with maximum priority 708 is found. In the exemplary embodiment, set p equal to the number of SIMD cores active in each round and set n equal to the number of flows to search. The first round starts with p=n/2. In each round, both n and p are reduced by half. Xi is the flow index in the flow table at location i of the input array. The arrows 710, 712, 714, 716, 718, 720, 722 represent the priority comparison between Xi and Xj. Mij indicates the flow index with maximum priority from location i to j. The search proceeds until n equals 2 and p equals 1. After this, one comparison by the last core gives the final answer. As depicted in the exemplary embodiment, the search implies O(log 2 n) computation times where n is the number of flows to search.

Figure 8:
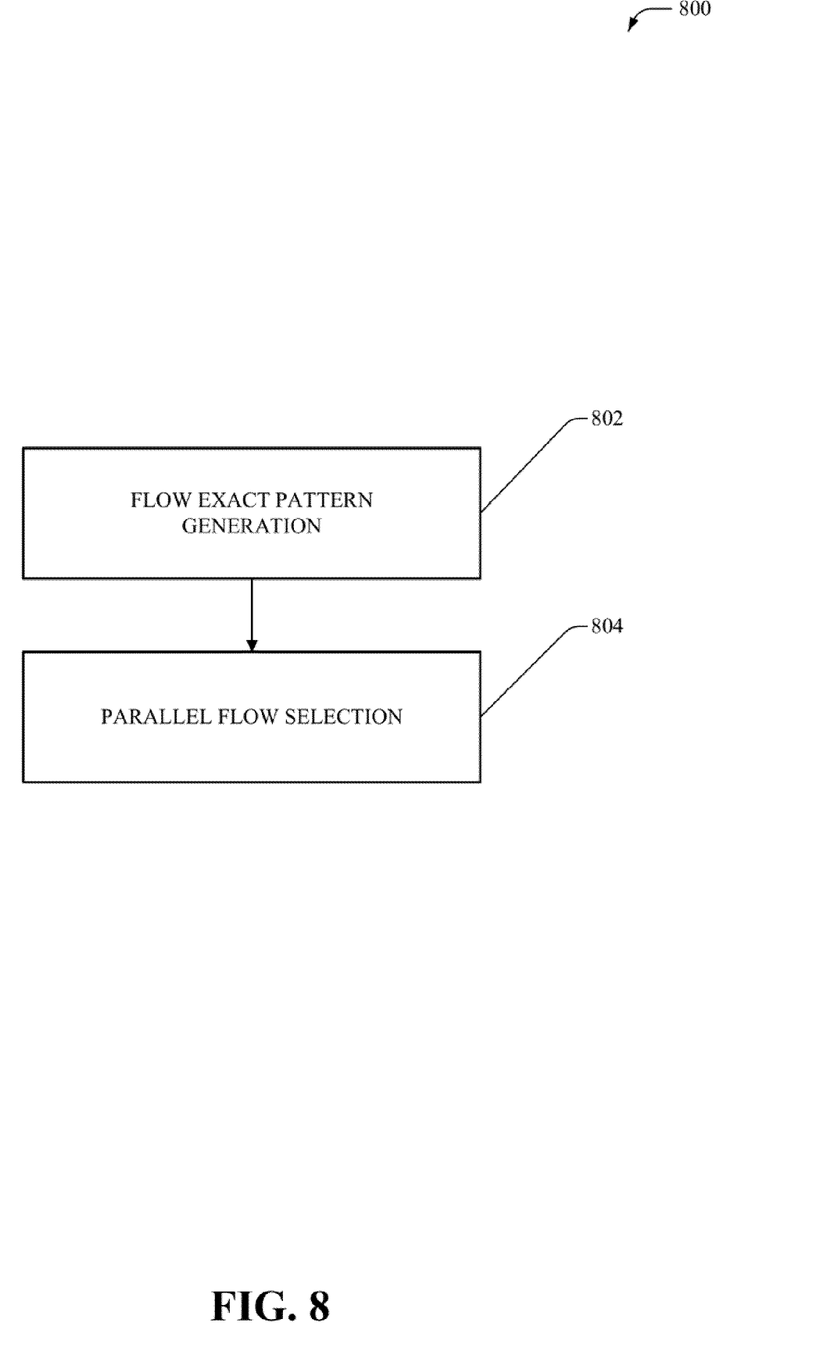
FIG. 8 depicts a method for enhancing table lookups with flow exact and wildcard matching for parallel environments.

Turning now to FIG. 8, an exemplary method embodiment 800 based on enhancing a table lookup for a parallel computing environment is depicted. Starting at exemplary method embodiment step 802, a plurality of flow exact patterns is generated, based on an associated flow table, for grouping flows based on similar exact value fields. It should be noted in the exemplary embodiment that the number of flow exact patterns is less than or equal to the number of flows. Further in the exemplary embodiment, it should be noted that each flow exact pattern has its own hash table for storing the flows associated with the flow exact pattern. Next, the exemplary embodiment groups flows by comparing a plurality of flows and groups the indexes of all flows wherein all fields of said flows with the same exact value are matched. The exemplary embodiment then generates a table for each group of indexes and stores a predetermined flow priority with each flow index.

Continuing at step 804 of the exemplary embodiment, the plurality of flow exact pattern hash tables, created by step 802 of the exemplary embodiment, is provided as input to parallel flow selection of step 804. The exemplary embodiment utilizes a parallel flow selection, based on said plurality of flow exact patterns, for selecting the highest priority flow from said plurality of flow exact patterns by iterating through the plurality of hash tables on parallel processors/cores comparing predefined flow priorities to determine the flow with the highest priority as the output of the lookup. In another aspect, the exemplary embodiment selects a highest priority flow from a plurality of flows by distributing the plurality of flows equally among a plurality of processors and/or processor cores, performing a first iteration of each processor and/or processor core through the assigned flows to determine the flow with the highest priority and then performing a second iteration of comparing the processor and/or processor core output of highest priority to another processor and/or processor core output of highest priority to select the highest priority flow.

Figure 9:
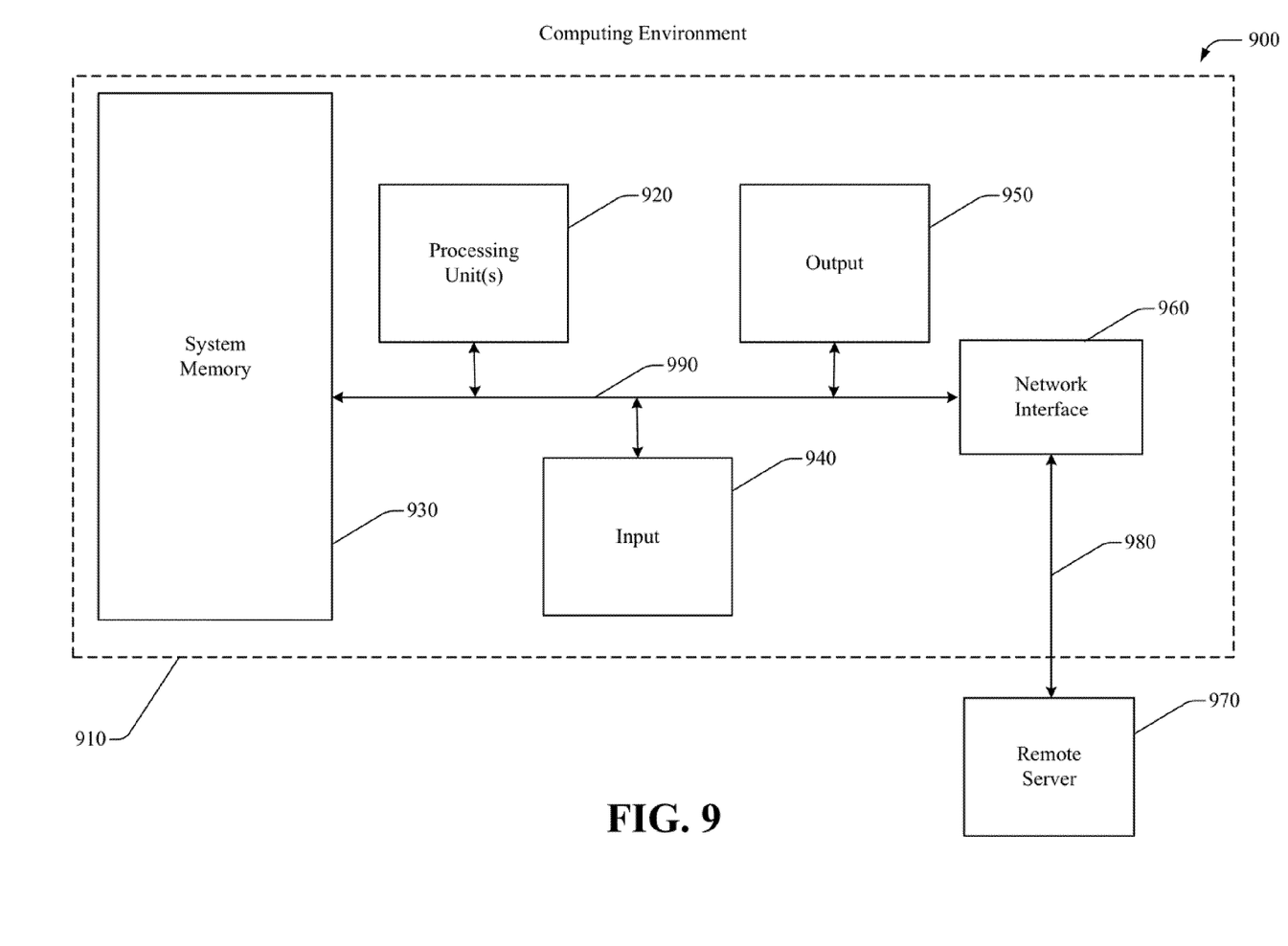
FIG. 9 depicts an exemplary computing device for implementing a method for enhancing table lookups with flow exact and wildcard matching for parallel environments.

FIG. 9 illustrates an example of a suitable computing system environment 900 in which the claimed subject matter can be implemented, although as made clear above, the computing system environment 900 is only one example of a suitable computing environment for an exemplary embodiment and is not intended to suggest any limitation as to the scope of use or functionality of the claimed subject matter. Further, the computing environment 900 is not intended to suggest any dependency or requirement relating to the claimed subject matter and any one or combination of components illustrated in the example computing environment 900.

Looking now to FIG. 9, an example of a device for implementing the previously described innovation includes a general purpose computing device in the form of a computer 910. Components of computer 910 can include, but are not limited to, a processing unit 920, a system memory 930, and a system bus 990 that couples various system components including the system memory to the processing unit 920. The system bus 990 can be any of several types of bus structures including a memory bus or memory controller, a peripheral bus, and a local bus using any of a variety of bus architectures.

Computer 910 can include a variety of computer readable media. Computer readable media can be any available media that can be accessed by computer 910. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media can embody computer readable instructions, data structures, program modules or other data in a modulated data signal such as a carrier wave or other transport mechanism and can include any suitable information delivery media.

The system memory 930 can include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, can be stored in memory 930. Memory 930 can also contain data and/or program modules that are immediately accessible to and/or presently being operated on by processing unit 920. By way of non-limiting example, memory 930 can also include an operating system, application programs, other program modules, and program data.

The computer 910 can also include other removable/non-removable and volatile/nonvolatile computer storage media. For example, computer 910 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 990 through a non-removable memory interface such as an interface, and a magnetic disk drive or optical disk drive can be connected to the system bus 990 by a removable memory interface, such as an interface.

A user can enter commands and information into the computer 910 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 920 through user input 940 and associated interface(s) that are coupled to the system bus 990, but can be connected by other interface and bus structures, such as a parallel port, game port or a universal serial bus (USB).

A graphics subsystem can also be connected to the system bus 990. In addition, a monitor or other type of display device can be connected to the system bus 990 through an interface, such as output interface 950, which can in turn communicate with video memory. In addition to a monitor, computers can also include other peripheral output devices, such as speakers and/or printing devices, which can also be connected through output interface 950.

The processing unit 920 can comprise a plurality of processing cores providing greater computational power and parallel computing capabilities. Further, the computing environment 900 can contain a plurality of processing units providing greater computational power and parallel computing capabilities. It should be noted that the computing environment 900 can also be a combination of multi-processor and multi-core processor capabilities.

The computer 910 can operate in a networked or distributed environment using logical connections to one or more other remote computers, such as remote server 970, which can in turn have media capabilities different from device 910. The remote server 970 can be a personal computer, a server, a router, a network PC, a peer device or other common network node, and/or any other remote media consumption or transmission device, and can include any or all of the elements described above relative to the computer 910. The logical connections depicted in FIG. 9 include a network 980, such as a local area network (LAN) or a wide area network (WAN), but can also include other networks/buses.

When used in a LAN networking environment, the computer 910 is connected to the LAN 980 through a network interface 960 or adapter. When used in a WAN networking environment, the computer 910 can include a communications component, such as a modem, or other means for establishing communications over a WAN, such as the Internet. A communications component, such as a modem, which can be internal or external, can be connected to the system bus 990 through the user input interface at input 940 and/or other appropriate mechanism.

In a networked environment, program modules depicted relative to the computer 910, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations captured from events and/or data. Captured events and data can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method of enhancing a table lookup for a parallel computing environment, said method comprising:
generating a plurality of flow exact patterns, based on an associated flow table, for grouping flows based on similar exact value fields; and
utilizing a parallel flow selection, based on said plurality of flow exact patterns, for selecting a highest priority flow from said plurality of flow exact patterns;
said flow exact patterns comprising the maximum combinations of said flows from said flow table, based on a binomial coefficient calculation, plus one additional entry;
said binomial coefficient calculation being the number of field combinations of said flows, from said flow table, associated with said fields.

2. The method of claim 1, wherein said one additional entry comprises all wildcards for a default matching condition.

3. The method of claim 1, wherein the number of said flow exact patterns equals or is less than the number of flows from said flow table.

4. The method of claim 1, wherein each flow exact pattern has its own hash table for storing flows associated with said flow exact pattern.

5. The method of claim 1, wherein said parallel flow selection is distributed among a plurality of Single Instruction Multiple Data (SIMD) processor cores.

6. The method of claim 5, wherein said parallel flow selection is based on the flow having the highest priority.

7. An apparatus comprising:
a plurality of processor cores, configured to:
generate a plurality of flow exact patterns based on an associated plurality of flows from a flow table; and
select a highest priority flow utilizing a parallel flow selection based on said plurality of flow exact patterns;
said flow exact patterns comprising the maximum combinations of said flows from said flow table, based on a binomial coefficient calculation, plus one additional entry;
said binomial coefficient calculation being the number of field combinations of said flows, from said flow table, associated with said fields.

8. The apparatus of claim 7, wherein said plurality of processor cores are further configured to execute single instruction multiple data (SIMD) instructions.

9. The apparatus of claim 7, further comprising a hash table having flow exact patterns and wherein said plurality of processor cores are further configured to store all flows associated with a particular flow exact pattern in the hash table.

10. A method of grouping flows, said method comprising:
generating a plurality of flow exact patterns, based on an associated flow table, for grouping flows based on similar exact value fields;
comparing a plurality of flows and grouping indexes of all flows, all fields of said flows with the same exact value being matched;
generating a table for each group of said indexes; and
storing a predetermined flow priority with each flow index in said table;
said groups of indexes being bounded by a number of combinations of fields of said plurality of flows plus one additional group of indexes.

11. The method of claim 10, wherein said table is a hash table.

12. The method of claim 10, wherein said bound is equal to or less than the number of flows.

13. The method of claim 10, wherein said one additional group of indexes is a default group that matches every flow.

14. An apparatus comprising:
a plurality of processor cores, configured to:
generate a plurality of flow exact patterns based on an associated plurality of flows from a flow table;
compare a plurality of flows and grouping indexes of all flows, all exact fields of said plurality of flows having the same exact value being matched;
generate a table for each group of said indexes; and
store a predetermined flow priority, with each flow index, in said table;
said groups of indexes being bounded by a number of combinations of fields of said plurality of flows plus one additional group of indexes.

15. The apparatus of claim 14, wherein said plurality of processor cores are further configured to store an entry in said table where all fields are wildcards for a default matching entry.

16. A method of selecting a highest priority flow from a plurality of flows, said method comprising:
generating a plurality of flow exact patterns, based on an associated flow table, for grouping flows based on similar exact value fields;
utilizing a parallel flow selection, based on said plurality of flow exact patterns, for selecting a highest priority flow from said plurality of flow exact patterns;
distributing said plurality of flows equally among a plurality of at least one of processors and processor cores;
performing a first iteration of each of the at least one of the processors and processor cores through comparing assigned flows to select a flow with the highest priority; and
performing a second iteration of comparing each of the at least one of the processors and processor cores output of highest priority flow to another of the at least one of the processor and processor core output to select said highest priority flow;
said flow exact patterns comprising the maximum combinations of said flows from said flow table, based on a binomial coefficient calculation, plus one additional entry;
said binomial coefficient calculation being the number of field combinations of said flows, from said flow table, associated with said fields.

17. The method of claim 16, wherein each processor and processor core utilizes a single instruction multiple data (SIMD) instruction set.

18. The method of claim 16, wherein said first iteration performance is scalable up to a number of the at least one of the processors and processor cores equal to one-half the number of flows.

19. The method of claim 16, wherein a calculation of computation time is determined by the base 2 log of the number of the at least one of the processors and processor cores.

20. The method of claim 16, wherein said priority is predetermined and associated with said flows.

21. An apparatus comprising:
a plurality of processor cores, configured to:
generate a plurality of flow exact patterns based on an associated plurality of flows from a flow table;

select a highest priority flow utilizing a parallel flow selection based on said plurality of flow exact patterns;
　　distribute a plurality of flows equally among said plurality of processor cores;
　　perform a first iteration of each processor core through comparing assigned flows to select a flow with a highest priority as output; and
　　perform a second iteration of comparing said output from each processor core to select a flow with a highest priority as output;
　said flow exact patterns comprising the maximum combinations of said flows from said flow table, based on a binomial coefficient calculation, plus one additional entry;
　said binomial coefficient calculation being the number of field combinations of said flows, from said flow table, associated with said fields.

22. The apparatus of claim 21, wherein said plurality of processor cores are further configured to execute single instruction multiple data (SIMD) instructions.

23. The apparatus of claim 21, wherein said priority is predetermined and associated with a flow.

\* \* \* \* \*